Patented June 9, 1936

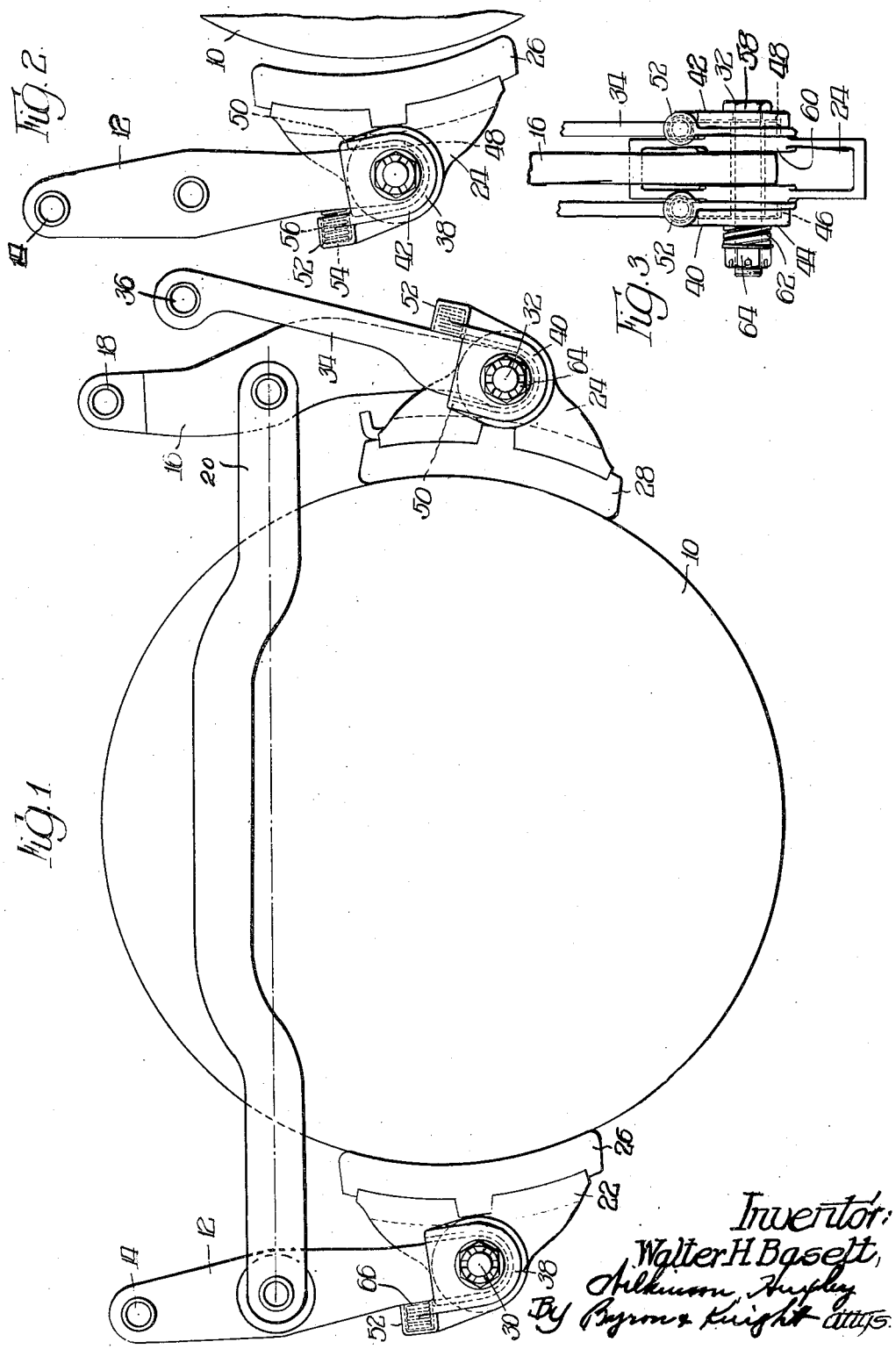

2,043,693

UNITED STATES PATENT OFFICE 2,043,693

CLASP BRAKE

Walter H. Baselt, Chicago, Ill., assignor to American Steel Foundries, Chicago, Ill., a corporation of New Jersey Application January 16, 1933, Serial No. 651,864

25 Claims. (Cl. 188—230)

This invention pertains to a brake arrangement and more particularly to a brake head balancing device for use on clasp brakes.

An object of this invention is to provide an automatically adjustable brake head balancing device for the beamless type of brake rigging.

Another object of the invention is to provide a brake arrangement wherein vibration and consequent wear between the heads, the hangers, and the pivot bolts are prevented.

A further object is to provide a brake arrangement wherein the shoes are disposed and maintained to prevent dragging on the associated vehicle wheel.

A yet further object is to provide a brake arrangement wherein the top of the brake shoe is prevented from dragging on the associated vehicle wheel.

A still further object is to provide a device which can be applied to existing types of brake rigging as well as to special types for balancing the brake head.

Another object is to provide a frictional brake balancing device which is inexpensive to make and maintain, and fulfills all requirements of manufacture and service.

With these and various other objects in view, the invention may consist of certain novel features of construction and operation as will be more fully described and particularly pointed out in the specification, drawing and claims appended hereto.

In the drawing, which illustrates an embodiment of the device and wherein like reference characters are used to designate like parts—

Figure 1 is a side elevation of a vehicle wheel showing the application thereto of a brake arrangement embodying the invention;

Figure 2 is a fragmentary side elevation of the dead truck lever of the arrangement shown in Figure 1, showing the brake shoe in inoperative or released position;

Figure 3 is a fragmentary end elevation of the live truck lever shown in the arrangement illustrated in Figure 1.

The balancing device as shown is applied to the beamless type of brake rigging. The vehicle wheel 10 of a car, for example, is provided with the hanger lever 12 consisting of a pair of identical left and right levers (shown as one) disposed adjacent one edge of the periphery of the wheel and pivoted to the car body or truck thereof as at 14. The live truck or operating lever 16 is disposed opposite the dead truck lever on the other side of the periphery of the wheel and is adapted to be operated by a connection at 18, the hanger lever 12 and the live truck or operating lever 16 being connected by the pull rod as indicated generally by the line 20, the linkage being substantially that as illustrated in application Serial No. 664,680, filed April 6, 1933. The brake heads 22 and 24 are provided with the brake shoes 26 and 28 respectively, the heads being pivoted at 30 and 32 by similar connections to the lower ends of the hanger lever 12 and the live or operating lever 16, respectively, the brake head 24 being supported on a car body or truck frame by means of the brake hangers 34 pivoted at their lower ends to the brake head at the connection 32, and pivoted adjacent their upper ends as at 36 to the car body or truck frame.

In order to provide an automatically adjustable brake head balancing device which will prevent brake head vibration and the resultant wear between the parts, and will also prevent the upper end of the brake shoe from contacting the wheel first, the balancing device 38 is provided at each brake head pivot point 30 and 32. The device consists of right and left hand friction arms 42 and 40, each of said arms consisting essentially of a body portion 44 flanged as at 46 to provide an open channeled portion 48 for embracing the ends of the brake hangers 34 and the hanger levers 12. One edge of the flange is provided with a stop portion 50 adapted to contact the brake hanger or the hanger lever as shown in Figure 2 for limiting the return movement of the brake shoe when the brakes are in released position. The opposing edge of the flange is provided with the socket portion 52 having a spring seat 54 for receiving the coil spring 56, the coil spring 56 contacting the back of the brake hangers or hanger levers.

The arms are fastened in position by means of the pivots 30 and 32, the pivots consisting essentially of the hanger pin or bolt 58 extending through aligned apertures in the arms, the brake hangers 34 or hanger levers 12 and the spaced bosses 60 of the brake head, and through the live or operating lever 16, where such is used. The arms are maintained in frictional contact with the bosses of the brake head by means of the coil spring 62 disposed between one of the arms and adjusted by means of the nut 64 provided on the bolt.

In operation of the device the head and hangers pivot on the hanger pins 58 when the brake is applied, the bottom of the shoe contacting the wheel first. Continued brake application forces the brake shoe into braking contact with the periphery of the wheel 10, causing further pivotal movement between the head and friction arms and the hangers, the friction arms moving with the head. This movement causes compression of the spring 56 against the backs of the brake hangers or hanger levers, which upon release of the brake system, causes the head and shoe to return to their initial positions as shown in Figure 2 whereby the top of the brake shoe is prevented from dragging upon the wheel. A flat surface 66 may be provided on the back of the hangers and hanger levers for accommodating the spring 56.

Such a device is self-accommodating, as wear of the shoe causes the shoe to more nearly approach concentricity with the wheel. Also, as the shoe or wheel wears, the rotating movement of the head during brake application becomes greater than the clearance between the face of the friction arm spring pockets 52 which act as stops, whereupon further movement causes an adjusting movement of the friction arms so that the head has an independent movement by overcoming the frictional resistance between the friction arms and head as applied by the spring 62. Release of the brake rigging and this adjusting movement causes the parts of the brake rigging to asume similar relative positions, as the friction arms have adjusted themselves with respect to the head, so that the spring 56 will continue to function to return the brake shoe to a position to prevent dragging of the upper edge of the brake shoe on the wheel.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In a brake arrangement, the combination of a brake head, a support therefor, a means pivotally connecting said head and support, and means embracing said support and secured by said first named means for positioning said head with respect to said support.

2. In a brake arrangement, the combination of a brake head, a support therefor, a means pivotally connecting said head and support, means secured by said first named means for positioning said head with respect to said support, and a stop on said second named means for limiting relative movement of said head and support.

3. In combination, a brake head, a brake hanger, pivot means securing said brake hanger to said brake head, an arm enclosing said hanger and secured to said head by said pivot means and clearing said hanger to permit limited rotation of said head on said hanger.

4. In combination, a brake head, a brake hanger, pivot means securing said brake hanger to said brake head, an arm enclosing said hanger and secured to said head by said pivot means and clearing said hanger to permit limited rotation of said head on said hanger, and resilient means disposed between said arm and said hanger.

5. In combination, brake heads applied to both sides of a wheel, hangers supporting said heads, an arm enclosing each of said hangers and mounted to turn with said head through a limited movement relative to said hanger.

6. In combination, brake heads applied to both sides of a wheel, hangers pivotally supporting said heads, an arm enclosing each of said hangers and mounted to turn with said head through a limited movement relative to said hanger, said limited movement being determined by the opposite edges of said hanger contacting with opposing surfaces on said arm.

7. In combination, a brake head, a brake hanger, pivot means securing said brake hanger to said brake head, an arm enclosing said hanger and pivotally secured to said head by said pivot means and clearing said hanger to permit limited rotation of said head on said hanger, and resilient means on said pivot means to prevent relative movement between said arm and said brake head except when the brakes are applied.

8. A friction arm for brake rigging including a body portion flanged to embrace a portion of a brake hanger, said flange being provided with a stop portion adapted to abut said brake hanger.

9. A friction arm for brake rigging including a body portion flanged to embrace a portion of a brake hanger, said flange being provided with a stop portion adapted to abut said brake hanger, and a spring seat provided in opposed relation to said stop portion.

10. A friction arm for brake rigging including a body portion flanged to embrace a portion of a brake hanger, and a stop portion adapted to abut said brake hanger.

11. A friction arm for brake rigging including a body portion flanged to embrace a portion of a brake hanger, a stop portion adapted to abut said brake hanger, and a spring seat provided in opposed relation to said stop portion.

12. A friction arm for brake rigging including a body portion flanged to embrace a portion of a brake hanger, a stop portion adapted to abut said brake hanger, and a socket provided on said arm facing said stop portion and having a spring seat therein.

13. In combination, brake heads applied to opposite sides of a wheel, hangers pivotally supporting said heads, arms enclosing the ends of said hangers and secured to said heads and limiting the rotation of said heads on said hangers, and resilient means between said arms and said hangers whereby said brake heads are held substantially concentric with said wheel in both the applied position and the released position.

14. In a brake arrangement, the combination of a brake head, a support therefor, connecting means for said head and support, means embracing said support and engaging said head for resisting relative movement of said head in respect to said support, and means for moving said head relative to said support a limited amount under certain conditions.

15. In a brake arrangement, the combination of a brake head, a support therefor, means connecting said head and support to resist relative movement therebetween, said means including an arm embracing said support and urged into frictional engagement with said support, and means for moving said head and connecting means as a unit a limited amount in respect to said support under certain conditions.

16. In a brake arrangement, the combination of a brake head, a support therefor, means connecting said head and support and including means embracing said support and resiliently urged into engagement with said support for resisting relative movement of said head and support, and means cooperating with said last-named means for moving said head and last-named means as a unit a limited amount in respect to said support under certain conditions.

17. In a brake arrangement, the combination of a brake head, a support therefor, means connecting said head and support and including means for frictionally resisting movement of said head relative to said support, means between said last-named means and said support for moving said last-named means and head as a unit in respect to said support under certain conditions, and means for limiting said last-named movement.

18. In combination, a wheel, a brake head having a brake shoe engageable with the tread of said wheel, a support for moving said shoe into and out of engagement with the tread of said wheel, means connecting said support and head including means embracing said support and urged into engagement with said support to resist movement of said head relative to said support except when said shoe is applied to said wheel, and means for moving said head a limited amount relative to said support upon disengagement of said shoe from said tread and movement thereof into spaced relation thereto.

19. In a brake arrangement, the combination of a brake head, spaced hangers disposed on opposite sides of said head, means for connecting said head to said hangers, means for effecting a frictional connection between said head and hangers to resist relative movement therebetween, and means between said last named means and hangers for overcoming said frictional resistance to move said head relative to said hangers a limited amount under certain conditions.

20. In a brake arrangement, the combination of a brake head, spaced hangers disposed on opposite sides of said head, means for connecting said head to said hangers, means exteriorly of said hangers and engaging said head for effecting a frictional connection between said head and hangers to resist relative movement therebetween, and means between said last named means and hangers for overcoming said frictional resistance to move said head relative to said hangers a limited amount under certain conditions.

21. In a brake arrangement, the combination of a brake head having spaced walls, a brake operating lever disposed between said walls, spaced hangers disposed exteriorly of said walls, means for connecting said head to said hangers and lever, means for effecting a frictional connection between said head and hangers to resist relative movement therebetween, and means between said last named means and hangers for overcoming said frictional resistance to move said head relative to said hangers a limited amount under certain conditions.

22. In a brake arrangement, the combination of a brake head having spaced walls, a brake operating lever disposed between said walls, spaced hangers disposed exteriorly of said walls, means for connecting said head to said hangers and lever, means exteriorly of said hangers and engaging said walls for effecting a frictional connection between said head and hangers to resist relative movement therebetween, and means between said last named means and hangers for overcoming said frictional resistance to move said head relative to said hangers a limited amount under certain conditions.

23. In combination, a wheel, brake heads disposed on opposite sides of said wheel and having brake shoes engageable with the tread of said wheel, hangers connected to said heads for support thereof, an operating lever connected to one of said heads, means connecting said lever to the hanger for the other of said heads whereby operative movements are transmitted thereto from said operating lever, means for effecting a frictional connection between said heads and hangers to resist relative movement therebetween, and means between said last named means and hangers for overcoming said frictional resistance to move said heads relative to said hangers a limited amount under certain conditions.

24. In combination, a wheel, brake heads disposed on opposite sides of said wheel and having brake shoes engageable with the tread of said wheel, spaced hangers connected to each of said heads for support thereof, an operating lever connected to one of said heads, means connecting said lever to the hanger for the other of said heads whereby operative movements are transmitted thereto from said operating lever, means for effecting a frictional connection between said heads and hangers to resist relative movement therebetween, and means between said last named means and hangers for overcoming said frictional resistance to move said heads relative to said hangers a limited amount under certain conditions.

25. In combination, a wheel, brake heads disposed on opposite sides of said wheel and having brake shoes engageable with the tread of said wheel, spaced hangers connected to each of said heads for support thereof, an operating lever connected to one of said heads, means connecting said lever to the hanger for the other of said heads whereby operative movements are transmitted thereto from said operating lever, means exteriorly of said hangers and engaging said heads for effecting a frictional connection between said heads and hangers to resist relative movement therebetween, and means between said last named means and hangers for overcoming said frictional resistance to move said heads relative to said hangers a limited amount under certain conditions.

WALTER H. BASELT.

CERTIFICATE OF CORRECTION.

Patent No. 2,043,693. June 9, 1936.

WALTER H. BASELT.

It is hereby certified that error appears in the printed specification of the above numbered patent requiring correction as follows: Page 1, second column, line 6, for the Serial Number 664,680 read 664,682; and that the said Letters Patent should be read with this correction therein that the same may conform to the record of the case in the Patent Office.

Signed and sealed this 22nd day of September, A. D. 1936.

Henry Van Arsdale (Seal) Acting Commissioner of Patents.